(12) United States Patent
Cruanes et al.

(10) Patent No.: US 11,487,870 B1
(45) Date of Patent: Nov. 1, 2022

(54) LOGGING FROM USER-DEFINED FUNCTIONS

(71) Applicant: Snowflake Inc., Bozeman, MT (US)

(72) Inventors: Thierry Cruanes, San Mateo, CA (US); Ganeshan Ramachandran Iyer, Redmond, WA (US); Isaac Kunen, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/326,646

(22) Filed: May 21, 2021

Related U.S. Application Data

(60) Provisional application No. 63/201,497, filed on Apr. 30, 2021.

(51) Int. Cl.
| | | |
|---|---|---|
| *G06F 21/54* | (2013.01) | |
| *G06F 16/2455* | (2019.01) | |
| *G06F 21/60* | (2013.01) | |
| *G06F 21/53* | (2013.01) | |

(52) U.S. Cl.
CPC .......... *G06F 21/54* (2013.01); *G06F 16/2455* (2019.01); *G06F 21/53* (2013.01); *G06F 21/602* (2013.01); *G06F 2221/033* (2013.01)

(58) Field of Classification Search
CPC ...... G06F 21/54; G06F 16/2455; G06F 21/53; G06F 21/602; G06F 2221/033
See application file for complete search history.

(56) References Cited

U.S. PATENT DOCUMENTS

| | | | | |
|---|---|---|---|---|
| 5,983,228 A | * | 11/1999 | Kobayashi | G06F 16/2291 |
| 10,628,244 B1 | * | 4/2020 | Cseri | H04L 63/0414 |
| 2010/0138639 A1 | * | 6/2010 | Shah | G06F 21/53 |
| | | | | 712/E9.032 |
| 2013/0262617 A1 | * | 10/2013 | Ligman | G06F 11/3476 |
| | | | | 718/100 |
| 2014/0047517 A1 | * | 2/2014 | Ding | H04L 12/1453 |
| | | | | 726/5 |
| 2015/0007156 A1 | * | 1/2015 | Tkach | G06F 8/656 |
| | | | | 717/170 |
| 2015/0350316 A1 | * | 12/2015 | Calder | H04L 63/0428 |
| | | | | 714/48 |
| 2018/0081924 A1 | * | 3/2018 | Johnston | G06F 16/278 |

FOREIGN PATENT DOCUMENTS

WO WO-2016209199 A1 * 12/2016 ........... G06F 21/552

* cited by examiner

*Primary Examiner* — Meng Li
(74) *Attorney, Agent, or Firm* — Schwegman Lundberg & Woessner, P.A.

(57) ABSTRACT

The logging techniques described herein can enable using logging tools without having to use different methods for sandbox implementations and push out the log data to storage without problems. The log data is treated as sensitive data and is protected according to the defined security policies. Further, the results may be compressed and encrypted.

24 Claims, 9 Drawing Sheets

800

802. 1. Timestamp - number
804. 2. Query Id - string
806. 3. Message - variant (json)
808. 4. Deployment - string
810. 5. Account Name - string
812. 6. Warehouse Name - string
814. 7. Cluster Number - number
816. 8. User - string
818. 9. Session Id - string

LOGGING FROM USER-DEFINED FUNCTIONS

CLAIMS OF PRIORITY

This patent application claims the benefit of priority U.S. Provisional Patent Application Ser. No. 63/201,497, titled "LOGGING FROM USER-DEFINED FUNCTIONS," filed on Apr. 30, 2020, which is hereby incorporated by reference herein in its entirety.

TECHNICAL FIELD

The present disclosure generally relates to cloud computing, more specifically to logging data from User-Defined Functions (UDF) executing in a secure environment.

BACKGROUND

Cloud-based data warehouses and other cloud database systems or data platforms sometimes provide support for user-defined functions that enable such systems to perform operations that are not available through the built-in, system-defined functions. However, for mitigating security risks, security mechanisms to ensure that user code running on such systems remain isolated are used.

Some programs execute on multi-tenant cloud environments, and their programs include user-defined functions (UDFs). To provide security, the programs are executed on safe environments, isolated from other tenants. However, by executing on safe, constrained environments, the UDFs are not able to log data.

BRIEF DESCRIPTION OF THE DRAWINGS

Various ones of the appended drawings merely illustrate example embodiments of the present disclosure and should not be considered as limiting its scope.

FIG. 8 shows a schema for a log file, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In computer security, a sandbox (e.g., sandbox environment) is a security mechanism for separating running programs, usually to prevent system failures or prevent exploitation of software vulnerabilities. A sandbox can be used to execute untested or untrusted programs or code, possibly from unverified or untrusted third parties, suppliers, users or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in an sandbox environment.

Logging from UDFs is important for debuggability during development and troubleshooting issues in production. Some existing solutions recommend users to log to tables from the UDF, but this approach is not scalable and a UDF typically does not allow running SQL queries. Moreover, logging to tables is not the normal procedure that programmers are accustomed to when using programming languages (e.g., Java, Python, etc.).

A log may be a record of transactions or activities that take place on a computer system. In one aspect, systems and methods are presented to provide logging support (using language-specific logging frameworks) for UDFs, and a scalable path to log at high volume to make the log data accessible to users using queries from the sandbox. Log data is treated as sensitive and handled with appropriate security policies, as with any other user data in the system.

Figure 1:
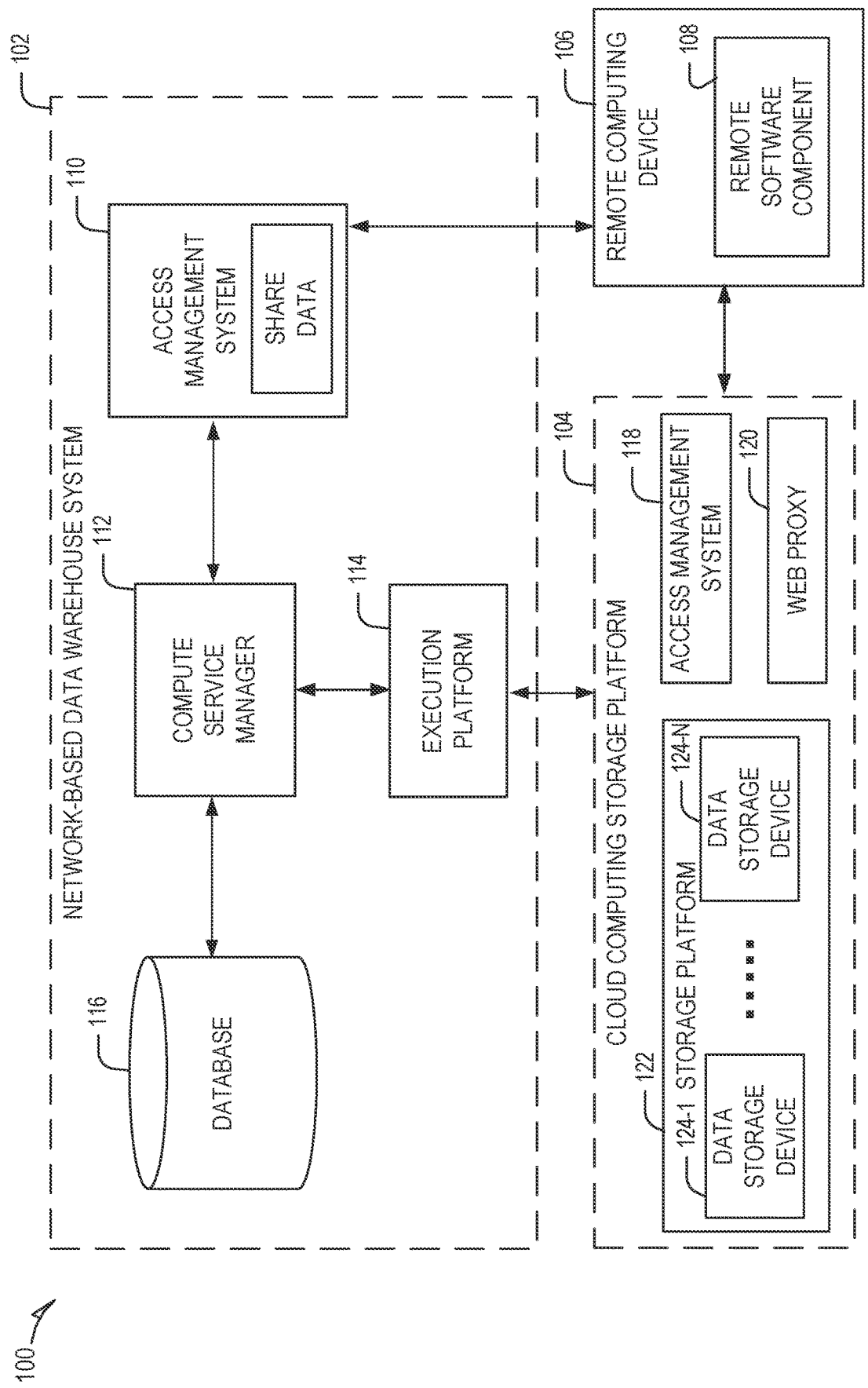
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
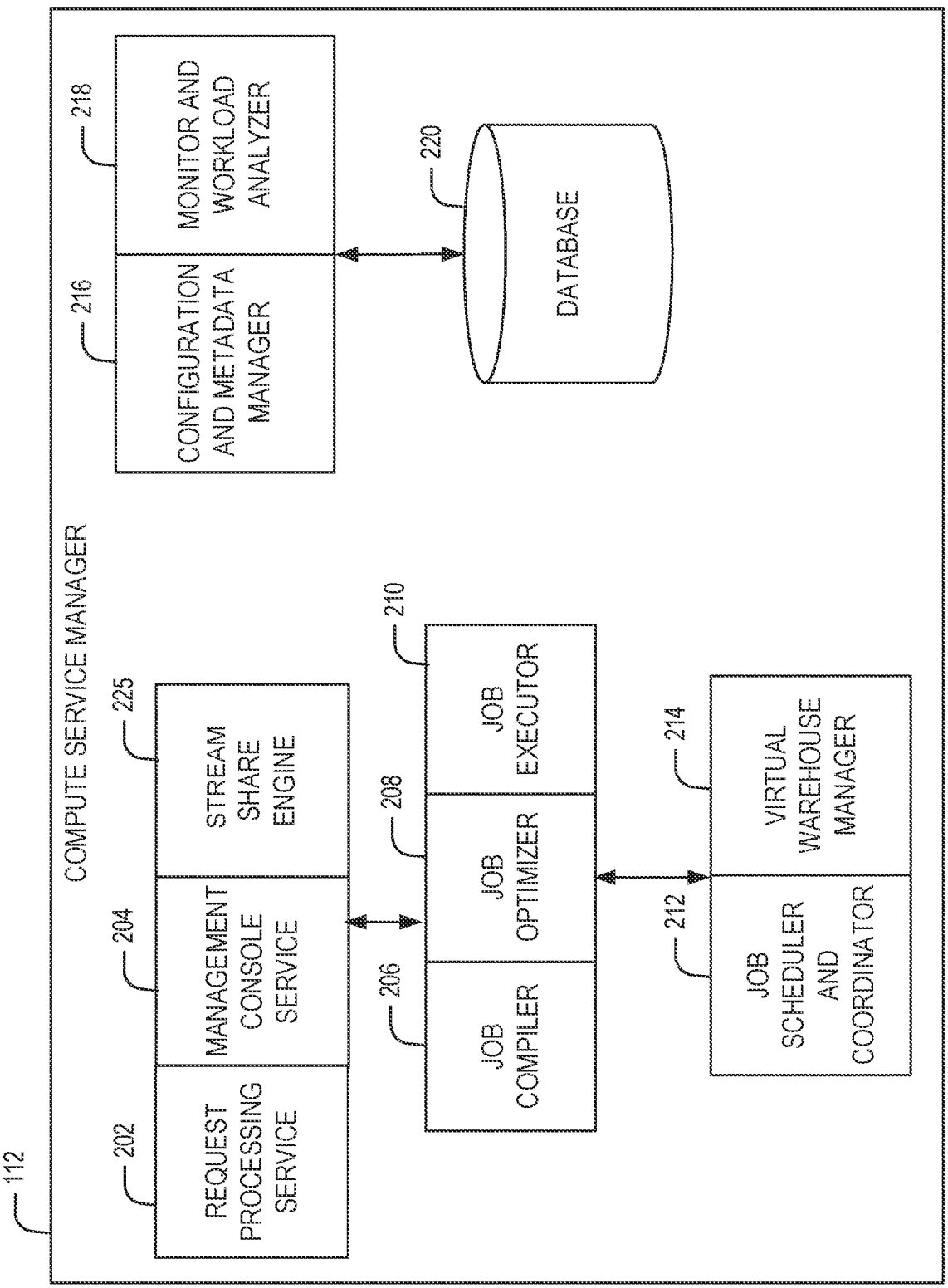
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
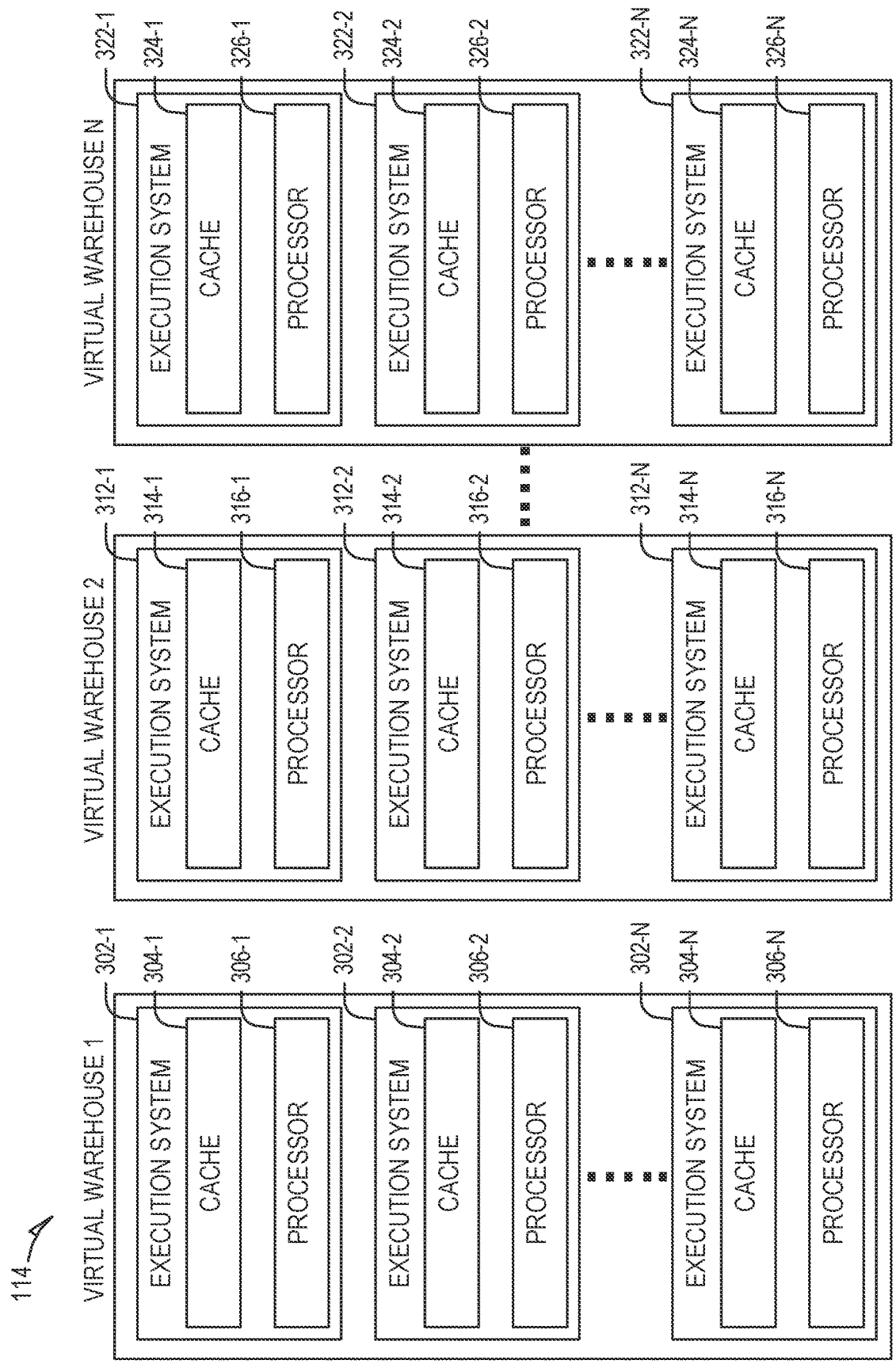
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
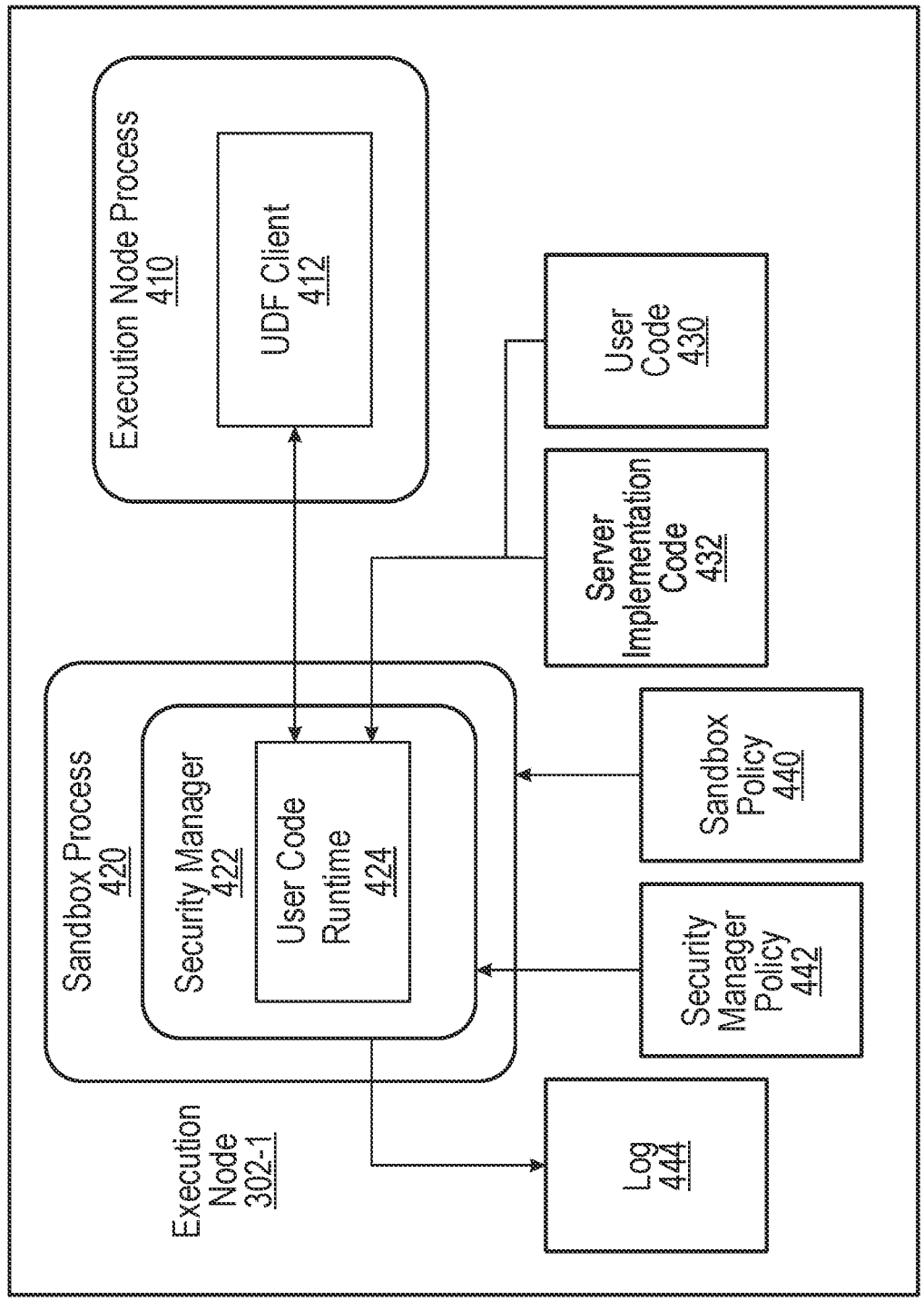
FIG. 4 shows a computing environment, according to some example embodiments.

FIG. 4 shows an example of a computing environment 400 conceptually illustrating an example software architecture executing a UDF by a process running on a given execution node of the execution platform, according to some example embodiments. The execution node may include an execution node process 410 with a UDF client 412, a sandbox process 420 with a security manger 422 and a user code runtime 424, a user code 430, a server implementation code 432, a sandbox policy 440, a security manager policy 442, and a log 444.

The execution node process 410 is executing a UDF Client 412 in the example of FIG. 4. In an embodiment, the UDF client 412 is implemented to support UDFs written in a particular programming language such as JAVA and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node, or at a separate location such as the storage platform, as described above. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

In production environments, there are typically three distinct user groups, which may have distinct privileges: a developer, who writes the code, but may not have access to production data; a user, who calls the function and has access to the data, but who may not have access to the function's code; and a support person, who will need to perform debugging and has access to at least some of the log data. One problem with logging is that the developer has to write the logs, but cannot have access to the logs once written, since the parameters to the function constitute data that they may not have permission to see.

Several users may wish to deploy their programs (e.g., machine learning (ML) models into a sandbox environment, on behalf of their customers, as Java or other language functions so they can log data. As these programs execute, the users want to log these calls (e.g., inputs and scores they produce) so that troubleshooting may be performed (e.g., drift detection) by a secondary process. These logs may contain data passed through the model and may be sensitive.

In some embodiments described herein, logging is enabled within the sandbox environment for UDFs. Users can debug and troubleshoot their programs by writing log statements to capture data and enable the analysis of the data from within the sandbox. The logging techniques described herein are designed to work with multiple environments, e.g., JAVA, SQL, PYTHON. Some embodiments are presented with reference to JAVA, but the same principles may be used for other environments.

The logging techniques described herein can enable using logging tools without having to use different methods for sandbox implementations and push out the data to storage without problems. The log data is treated as sensitive data and is protected according to the defined security policies as described herein. Further, the results may be encrypted, (e.g., using four session encryption keys), and when the log data is sent to storage, it may be compressed and encrypted.

Figure 5:
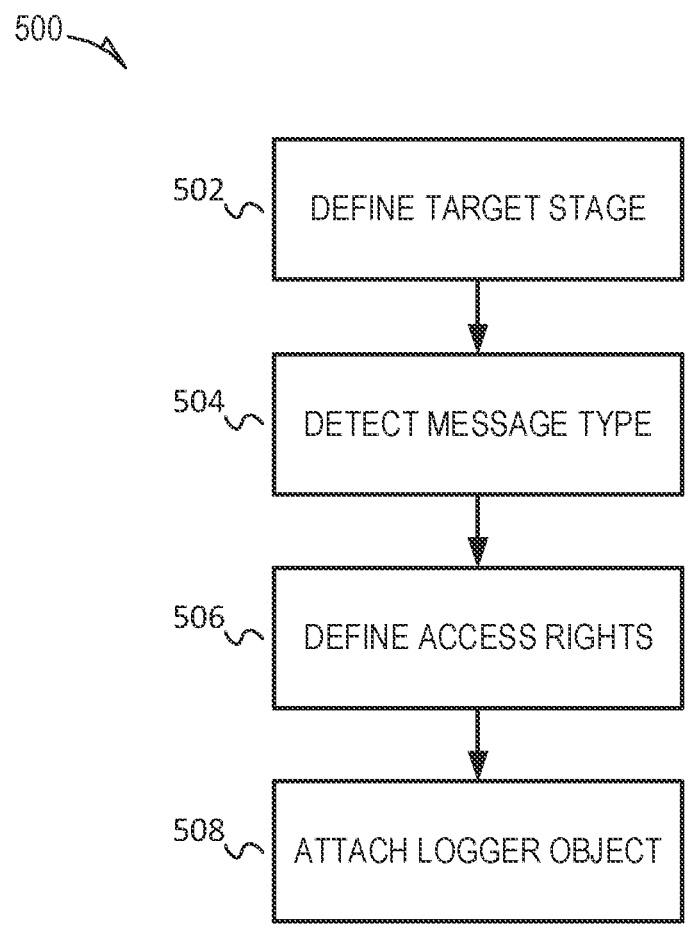
FIG. 5 shows a flow diagram of a method for creating a logger object, according to some example embodiments.

FIG. 5 shows a flow diagram of a method 500 for creating a logger object (or logger), according to some example embodiments. A logger object may be an account-level object. A logger object may be attached to another object, a function (e.g., UDF), a session, or a user. A logger object may handle manage logging permissions.

At operation 502, a target stage for the logger object may be defined. The target stage is the storage location where logs generated corresponding to the logger object will be uploaded and stored. The target stage may be an internal or external location. An internal location may be managed by the cloud processing system and therefore may be encrypted by the cloud processing system. For example, the logs corresponding to the logger object may be encrypted using managed keys by the cloud processing system.

An external location corresponds to a storage location outside the control of the cloud processing system. For example, an external location may be at another cloud storage location. Thus, permission may be granted to the cloud processing system to access and store the logs to the external location. In an embodiment, encryption may be utilized for the transmitting and storing the logs in the external location. For example, encryption keys (e.g., ASK, KMS) may be provided to the cloud processing system to encrypt the logs using the encryption keys for transmission and storage to the external location.

At operation 504, a log level for the logger object may be defined. One or more log levels may be selected. The log level corresponds to the type of information captured in the log. The log levels may be provided in a tiered fashion. Different log levels are used for different applications. In an embodiment, the log levels may include trace, debug, info, warn, error, fatal, etc. For example, trace may capture very fine-grained informational events; debug may capture fine-grained debug-relevant informational events; info (or informational) may capture coarse-grained informational messages; warn (or notice) may capture potentially harmful situations; error may capture error conditions that may let process continue; and fatal (or emergency or critical) may capture errors that cause the process to abort. The log levels may be related to the programming language of the attached function (e.g., Java, Python, etc.). In an embodiment, logging frameworks of different programming language may be fitted into the tiered log levels. Thus, the log levels provided may map to the different logging frameworks of different programming languages.

At operation 506, access rights of the logger object may be defined. The access rights may define which users are delegated access rights to the logger object. The access rights may also define which components of the logger object can be modified and by which users. For example, the access rights may define which users can modify or alter the target stage of the logger object and/or the log levels. If the target stage is modifiable, the access rights may also define encryption related rights. Usage of the logger object may be granted to users/roles to write log information via the logger object, even if those users do not have access rights to the target stage. The logger object may be modifiable via an alter command, for example.

At operation 508, the logger object may be attached. For example, the logger object may be attached to the specified object or function, such as a UDF. Thus, when the specified function is executed, a compiler may recognize that the logger object attached to the specified function and appropriate logging operations may be performed, as described in further detail below. In another embodiment, session-level or user-level logging may be provided. Session-level logs may capture holistic information on the session to aid in debugging. In an embodiment, when a session-level logger is used, any log operation run in the session is directed to the session-level logger. These operations may include: logging operations run directly in SQL; logging operations embedded in functions, table functions, or aggregates; and logging operations embedded in procedures The session parameter for a logger may be an alterable parameter.

Moreover, different logger objects may be utilized to capture logging data at different levels. For example, logs from function level as well as session/user level may be collected simultaneously. Here, a logger object for each of the different levels may be created and attached to the respective level object (e.g., function, session, user).

Figure 6:
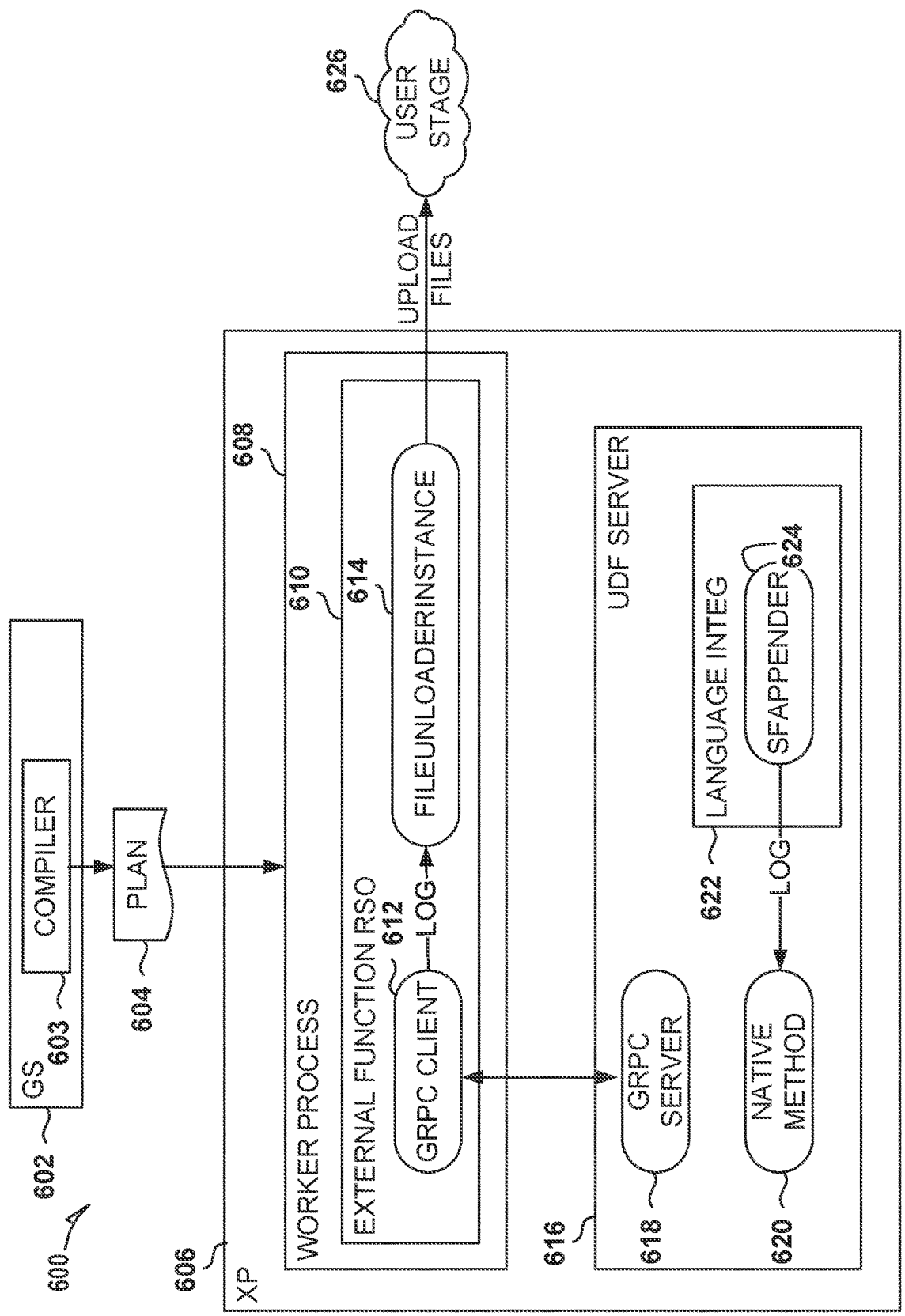
FIG. 6 shows a computing architecture for logging data, according to some example embodiments.

FIG. 6 shows an example of a computing architecture 600 for logging data, according to some example embodiments. The computing architecture 600 may include a global service (GS) 602 with a compiler 603, a plan 604, an XP 606, and a user stage 626. The XP 606 may include a worker process 608. The worker process 608 may include one or more external function RSO (Row Set Operator) 610. The external function RSO may correspond to an external function being logged; therefore, a plurality of external function RSOs may be provided, each corresponding to a different function being logged. The external function RSO 610 may include a gRPC (Remote Procedure Call) client 612 and a File Unloader Instance 614.

The XP 606 may also include a UDF server 616. The UDF server 616 may be provided as a sandbox and may be separated from the worker process 608 so that the UDF server 616 is restricted from accessing certain files and file systems. For example, the worker process 608 and the UDF server 616 may be provided as different processors on the same machine. The UDF server 616 may be provided in a common programming language such as C++. The UDF server 616 may include a gRPC client 618, a native method 620, a language-specific integration 622 with a SF appender 624. The language-specific integration 622 may correspond to a different programming language than the UDF server, such as JAVA, Python, JavaScript, SQL, etc. Indeed, the techniques described herein can be used for logging functions in different programming languages. The external function RSO 610 may communicate in a bi-directional mode with the UDF server 616 using their respective gRPC clients 612, 618, using API calls.

The compiler 603 may generate the plan 614, which is a plan for a function to be executed with an associated logger object. The compiler 603 may add additional properties to the plan 614 based on the logger object. The additional properties may include a target volume of the logs, a file master key used for encrypting the log data, a log level for the log data, and a prefix to add to log files in the target space.

The external function RSO 610 understands the new properties that were added to the plan 604 and initializes the context to unload files with those settings. The external function RSO 610 may communicate appropriate logging instructions to the UDF server 616 based on the plan 604.

The UDF server 616 runs on a separate sandbox than the worker process 608. The gRPC client and gRPC server have a communication path to exchange the log data. When the UDF server 616 is created, the language-specific integration 622 is created inside the sandbox (UDF server 616). For example, the language-specific integration 622 may be provided as a Java Virtual Machine (JVM) for a Java implementation. The SF appender 624 is code inserted in the language-specific integration 622 for capturing log data.

The SF appender 624 is an address to a method code that exists in the VSL, and the language-specific integration 622 can invoke it to go from manage to native environment. The SF appender 624 may call a module in the UDF server 616, as described in further detail below.

Additionally, to set up the logging, bindings are injected in the language-specific integration 622 to intercept the log calls in the language-specific integration 622. The language-specific integration 622 may then redirect logs to the SF appender 624. The SF appender 624 may perform some validations (e.g., does not exceed size limit) and invoke the native method 620 that is registered, and the language-specific integration 622 may pass the data via the native method 620, as described in further detail below.

The gRPC Server 618 streams the log data (e.g., via a provided API) to the gRPC client 612 in the worker process 608, and data may be streamed in both directions (e.g., logging instructions). As the SF appender 624 sends data, the data may be buffered and then transmitted through the stream. In some example embodiments, for security reasons, the log data may be treated as a message and is not changed or accessed, just treated as a stream of bytes to be forwarded until it reaches the user stage 626. The user stage 626 may be an internal or external stage defined by the corresponding logger object, as described above.

Multiple external functions with corresponding logging are supported. Each function will have a corresponding external function RSO with a different logger object. Thus, in an example, where a query has three functions to be logged, there would be three logger objects with three external function RSOs. Each function operator may produce separate logging information stored at a location based on the target stage information in each logger object.

Figure 7:
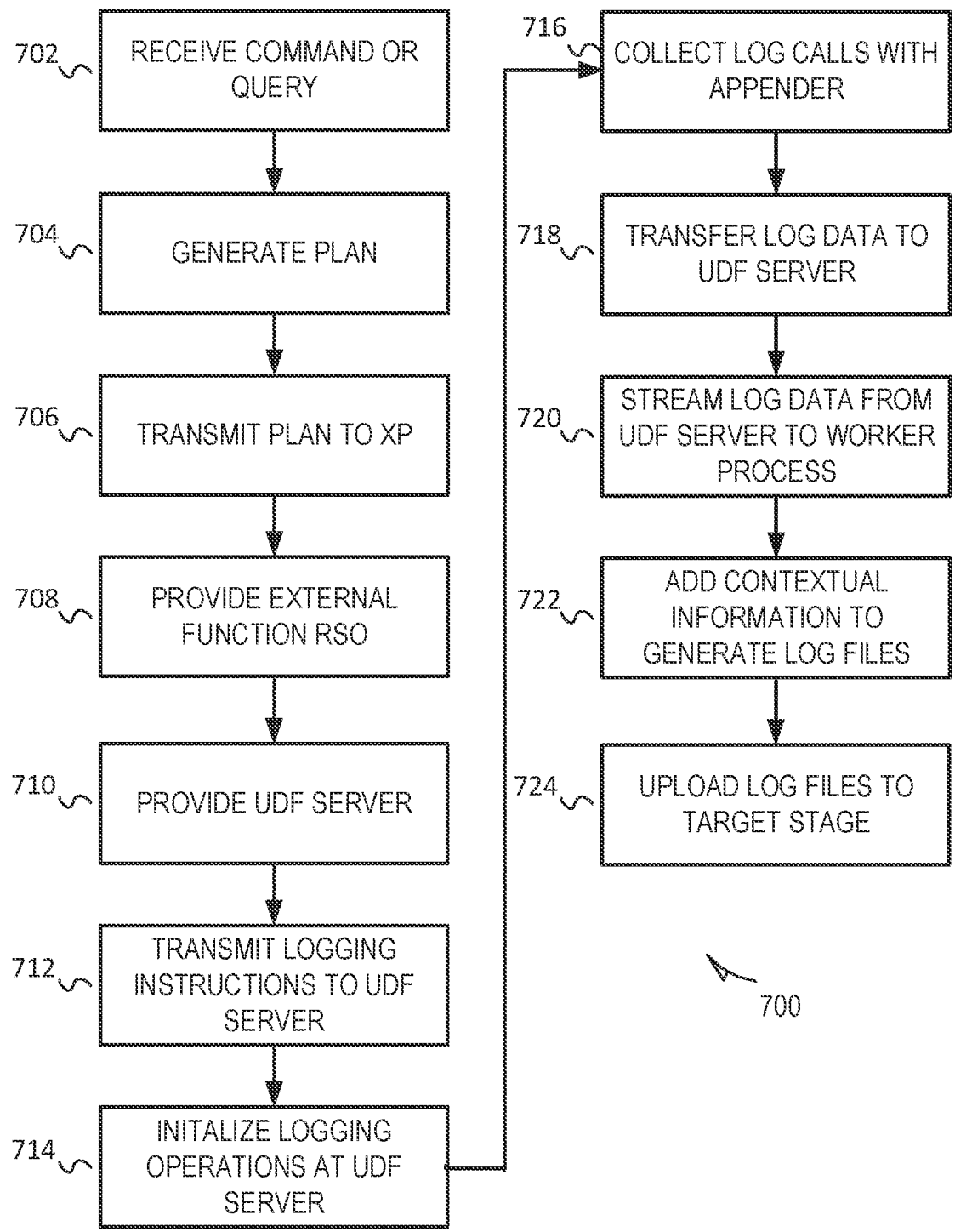
FIG. 7 shows a flow diagram of a method for logging data, according to some example embodiments.

FIG. 7 shows a flow diagram of a method 700 for logging data, according to some example embodiments. In an example, portions of the method 700 may be performed by the computing architecture 600, as described above with reference to FIG. 6. At operation 702, a command or query may be received. For example, a query may be received by a GS.

At operation 704, in response to the command or query, a plan to execute the command or query may be generated. For example, a compiler may generate a plan tree with different functions to execute the command or query. For each function (or session for session-level logging), the plan may take into account logging operations associated with that function, if any. A compiler may read a logger object associated with a function and may add additional properties to the plan based on the logger object. For example, the compiler may add additional properties such a target volume of the logs, a file master key used for encrypting the log data, a log level for the log data, and a prefix to add to log files in the target space.

At operation 706, the plan may be transmitted to an XP (or processing node). At operation 708, the XP, via a worker process, may create or provide an external function RSO for each external function in the plan. At operation 710, for each function requiring a sandbox, e.g., UDF, a sandbox (or UDF server) may be created or provided. Access to certain files may be restricted to the UDF server. The external function RSO and UDF server may communicate via remote calls (e.g., gRPC).

At operation 712, instructions regarding logging operations for the particular function may be transmitted from the external function RSO to the UDF server. At operation 714, the UDF server may initialize logging operations by injecting logging code into a language-specific integration, such as a Java virtual machine. The injected code may register a native method from the UDF server in the language-specific integration. The registration may include an address or pointer for the native method residing in the UDF server to pass the logging data from the language-specific integration to the UDF server. The registration may also include binding instructions to intercept log calls (or data), which are part of the language-specific integration. These binding instructions may redirect log calls to an SF appender.

At operation 716, the SF appender may collect the log calls. The SF appender may also format the data, perform validation checks on the data, and check the size of the data.

At operation 718, the SF appender may invoke the registered native method to transfer the log data from the language-specific integration to the UDF server.

At operation 720, the UDF server may then stream the log data from the UDF server to the worker process (or more specifically to the external function RSO) over gRPC using API calls. The format of the log data may be maintained during streaming from the UDF server to the worker process.

At operation 722, the worker process may add contextual information to the received log data and generate log files. This contextual information may not be known the UDF server because of the sandbox policy. The contextual information may provide information such as which user generated the logs, a session ID, a query ID, timing information, etc. This contextual information may be then used to filter the log files to access relevant information for debugging or other purposes.

At operation 724, the worker process, via a file unloader instance, may upload the log files to a target stage (or user stage). The target stage may be an internal or external location, as defined by the logger object for the respective function. Based on the target stage, the log files may be encrypted and compressed accordingly, as described above.

The log files may then be accessible and used for debugging purposes. The log files may be filtered based on the contextual information to access relevant information.

FIG. 8 illustrates a schema 800 for a log file, according to some example embodiments. As discussed above, log files with schema 800 may be generated by the worker process. The log file may be provided as a JSON object with the following fields: a timestamp 802, a query ID 804, a message (which is the log data) 806, a deployment ID 808, an account name 810, a warehouse name 812, a cluster number 814, a user ID 816, and a session ID 818. The message 806 field may be log data received from the UDF server and may be provided as a JSON object. Moreover, the log data in the message 806 field may be language specific. For example, if the language-specific integration is a Java virtual machine, the log data in the message 806 field may be in Java log format. The other fields may be added by the worker process, as described herein.

The logging techniques described herein provide a variety of benefits and advantages. For example, the logging techniques are scalable and support high-volume logging paths. Also, the logging techniques can work with functions in different programming languages by providing language specific frameworks, as described herein. Further, the logging techniques enable logging when the function is executed in a sandbox or other restrictive environment where outbound access is limited or no SQL statements can be executed. Moreover, the logging data is securely maintained using native encryption techniques described herein.

Figure 9:
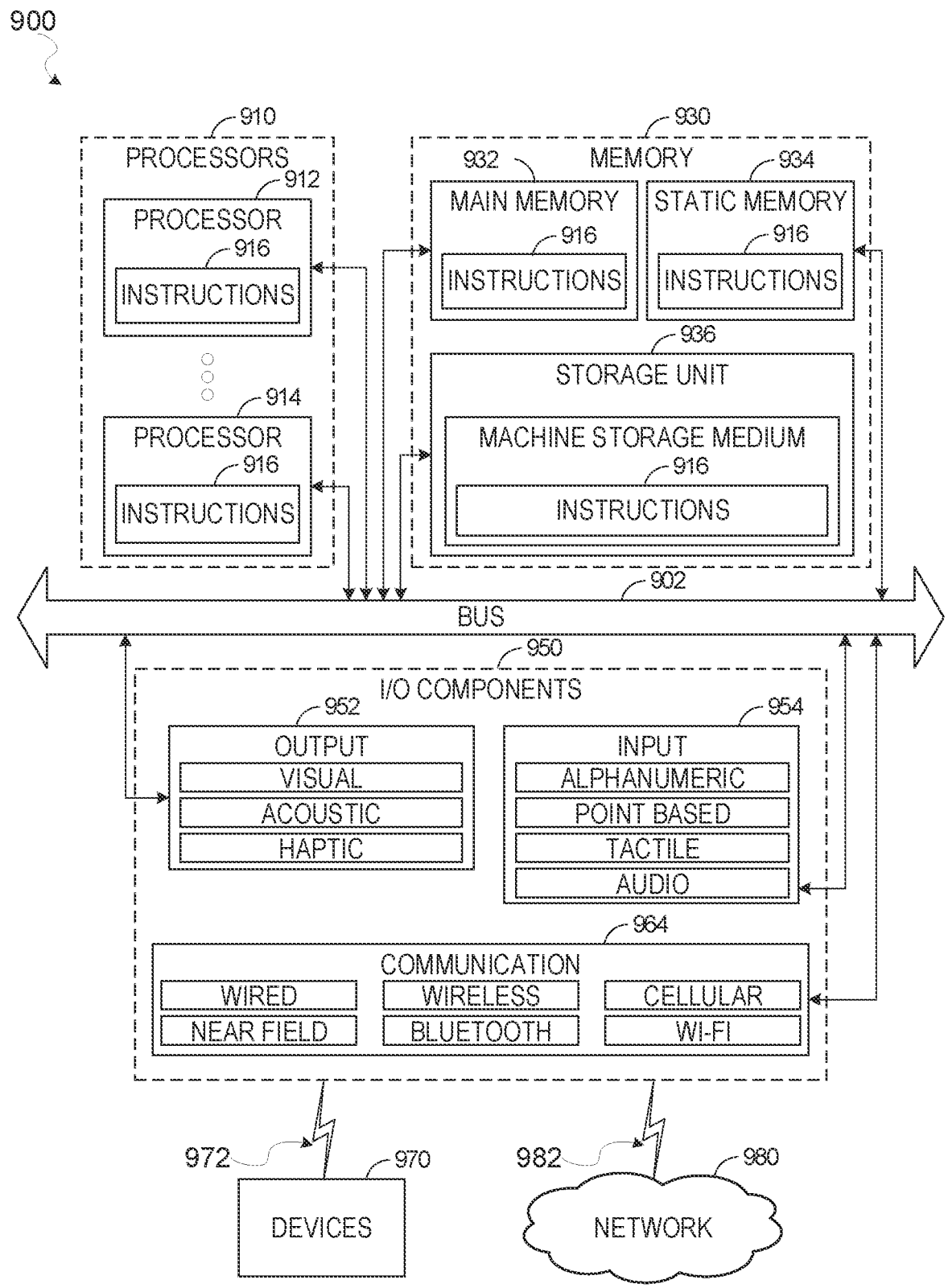
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 90, the compute service manager 92, the execution platform 94, the access management system 98, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: in response to receiving a query, generating a plan to execute the query with at least one external function, the plan including one or more properties for logging operations associated with the external function; providing an external function operator in a worker process of a processing node and providing a separate user defined function (UDF) server in the processing node; communicating logging instructions from the external function operator to the UDF server; based on the logging instructions, initializing logging operations in the UDF server by injecting code into a language-specific integration operating on the UDF server; based on the injected code, collecting log data from the language-specific integration by the UDF server; streaming the log data from the UDF server to the external function operator; and uploading the log data to a storage location.

Example 2. The method of example 2, wherein: the injected code registers a native method from the UDF server in the language-specific integration including an address for the native method in the UDF server to transmit log data from the language-specific integration to the UDF server, and the injected code includes binding instructions to intercept log data in the language-specific integration.

Example 3. The method of any of examples 1-2, wherein the UDF server and the language-specific integration operate using different programming languages.

Example 4. The method of any of examples 1-3, further comprising: generating a logger object including a target stage for uploading log data and a log level, wherein the target stage includes the storage location, wherein logging operations associated with the external function are based on the logger object.

Example 5. The method of any of examples 1-4, further comprising: attaching the logger object to the external function Example 6. The method of any of examples 1-5, further comprising: attaching the logger object to a session, wherein the session includes executing the external function.

Example 7. The method of any of examples 1-6, further comprising: adding, by the external function operator, contextual information to the log data to generate log files; and uploading the log files to the storage location, wherein the log files include the log data and the contextual information.

Example 8. The method of any of examples 1-7, further comprising: encrypting the log data based on encryption information stored in a logger object associated with the external function, wherein the storage location is an external location.

Example 9. The method of any of examples 1-8, wherein the UDF server and the worker process are associated with separate processors of the processing node and wherein the UDF server is restricted from accessing select data accessible by the worker process.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
   in response to receiving a query, generating a plan to execute the query with at least one external function, the plan including one or more properties for logging operations associated with the external function;
   providing an external function operator in a worker process of a processing node and providing a separate user defined function (UDF) server operating in a first programming language in the processing node, the UDF server provided in a sandbox environment separated from the worker process and restricted from accessing select data accessible by the worker process;
   communicating logging instructions from the external function operator to the UDF server;
   based on the logging instructions, initializing logging operations in the UDF server by injecting code into a language-specific integration operating in a second programming language on the UDF server, the injected code includes binding instructions to intercept log data in the language-specific integration;
   based on the injected code, collecting log data from the language-specific integration by the UDF server;
   streaming the log data from the UDF server to the external function operator; and
   uploading the log data to a storage location.

2. The method of claim 1, wherein:
the injected code registers a native method from the UDF server in the language-specific integration including an address for the native method in the UDF server to transmit log data from the language-specific integration to the UDF server.

3. The method of claim 1, further comprising:
generating a logger object including a target stage for uploading log data and a log level, wherein the target stage includes the storage location, wherein logging operations associated with the external function are based on the logger object.

4. The method of claim 3, further comprising:
attaching the logger object to the external function.

5. The method of claim 3, further comprising:
attaching the logger object to a session, wherein the session includes executing the external function.

6. The method of claim 1, further comprising:
adding, by the external function operator, contextual information to the log data to generate log files; and
uploading the log files to the storage location, wherein the log files include the log data and the contextual information.

7. The method of claim 1, further comprising:
encrypting the log data based on encryption information stored in a logger object associated with the external function,
wherein the storage location is an external location.

8. The method of claim 1, wherein the UDF server and the worker process are associated with separate processors of the processing node.

9. A machine-storage medium embodying instructions that, when executed by a machine, cause the machine to perform operations comprising:
in response to receiving a query, generating a plan to execute the query with at least one external function, the plan including one or more properties for logging operations associated with the external function;
providing an external function operator in a worker process of a processing node and providing a separate user defined function (UDF) server operating in a first programming language in the processing node, the UDF server provided in a sandbox environment separated from the worker process and restricted from accessing select data accessible by the worker process;
communicating logging instructions from the external function operator to the UDF server;
based on the logging instructions, initializing logging operations in the UDF server by injecting code into a language-specific integration operating in a second programming language on the UDF server, the injected code includes binding instructions to intercept log data in the language-specific integration;
based on the injected code, collecting log data from the language-specific integration by the UDF server;
streaming the log data from the UDF server to the external function operator; and
uploading the log data to a storage location.

10. The machine-storage medium of claim 9, wherein:
the injected code registers a native method from the UDF server in the language-specific integration including an address for the native method in the UDF server to transmit log data from the language-specific integration to the UDF server.

11. The machine-storage medium of claim 9, further comprising:
generating a logger object including a target stage for uploading log data and a log level, wherein the target stage includes the storage location, wherein logging operations associated with the external function are based on the logger object.

12. The machine-storage medium of claim 11, further comprising:
attaching the logger object to the external function.

13. The machine-storage medium of claim 11, further comprising:
attaching the logger object to a session, wherein the session includes executing the external function.

14. The machine-storage medium of claim 9, further comprising:
adding, by the external function operator, contextual information to the log data to generate log files; and
uploading the log files to the storage location, wherein the log files include the log data and the contextual information.

15. The machine-storage medium of claim 9, further comprising:
encrypting the log data based on encryption information stored in a logger object associated with the external function,
wherein the storage location is an external location.

16. The machine-storage medium of claim 9, wherein the UDF server and the worker process are associated with separate processors of the processing node.

17. A system comprising:
at least one hardware processor; and
at least one memory storing instructions that, when executed by the at least one hardware processor, cause the at least one hardware processor to perform operations comprising:
in response to receiving a query, generating a plan to execute the query with at least one external function, the plan including one or more properties for logging operations associated with the external function;
providing an external function operator in a worker process of a processing node and providing a separate user defined function (UDF) server operating in a first programming language in the processing node, the UDF server provided in a sandbox environment separated from the worker process and restricted from accessing select data accessible by the worker process;
communicating logging instructions from the external function operator to the UDF server;
based on the logging instructions, initializing logging operations in the UDF server by injecting code into a language-specific integration operating in a second programming language on the UDF server, the injected code includes binding instructions to intercept log data in the language-specific integration;
based on the injected code, collecting log data from the language-specific integration by the UDF server;
streaming the log data from the UDF server to the external function operator; and
uploading the log data to a storage location.

18. The system of claim 17, wherein:
the injected code registers a native method from the UDF server in the language-specific integration including an address for the native method in the UDF server to transmit log data from the language-specific integration to the UDF server.

19. The system of claim 17, the operations further comprising:

generating a logger object including a target stage for uploading log data and a log level, wherein the target stage includes the storage location, wherein logging operations associated with the external function are based on the logger object.

20. The system of claim 19, the operations further comprising:

attaching the logger object to the external function.

21. The system of claim 19, the operations further comprising:

attaching the logger object to a session, wherein the session includes executing the external function.

22. The system of claim 17, the operations further comprising:

adding, by the external function operator, contextual information to the log data to generate log files; and uploading the log files to the storage location, wherein the log files include the log data and the contextual information.

23. The system of claim 17, the operations further comprising:

encrypting the log data based on encryption information stored in a logger object associated with the external function, wherein the storage location is an external location.

24. The system of claim 17, wherein the UDF server and the worker process are associated with separate processors of the processing node.

* * * * *